(12) United States Patent
Post et al.

(10) Patent No.: US 8,521,948 B2
(45) Date of Patent: Aug. 27, 2013

(54) HANDLING DYNAMIC AND STATIC DATA FOR A SYSTEM HAVING NON-VOLATILE MEMORY

(75) Inventors: Daniel J. Post, Cupertino, CA (US); Nir J. Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 12/983,715

(22) Filed: Jan. 3, 2011

(65) Prior Publication Data
US 2012/0173832 A1 Jul. 5, 2012

(51) Int. Cl.
*G06F 12/00* (2006.01)
(52) U.S. Cl.
USPC .......................................... 711/103
(58) Field of Classification Search
None
See application file for complete search history.

(56) References Cited

U.S. PATENT DOCUMENTS

| 5,388,083 A | 2/1995 | Assar et al. | |
|---|---|---|---|
| 8,028,121 B2 * | 9/2011 | Jeong | 711/103 |
| 8,090,899 B1 * | 1/2012 | Syu | 711/103 |
| 8,103,821 B2 * | 1/2012 | Chang et al. | 711/103 |
| 8,266,481 B2 * | 9/2012 | Moshayedi | 714/710 |
| 8,275,928 B2 * | 9/2012 | Lin | 711/103 |
| 2005/0114589 A1 * | 5/2005 | Lofgren et al. | 711/103 |
| 2005/0132126 A1 | 6/2005 | Lin et al. | |
| 2007/0294490 A1 | 12/2007 | Freitas et al. | |
| 2008/0282025 A1 | 11/2008 | Biswas et al. | |
| 2009/0240873 A1 | 9/2009 | Yu et al. | |
| 2009/0265508 A1 | 10/2009 | Bennett et al. | |
| 2010/0037006 A1 | 2/2010 | Chen et al. | |
| 2010/0169542 A1 | 7/2010 | Sinclair | |
| 2010/0174845 A1 * | 7/2010 | Gorobets et al. | 711/103 |
| 2010/0211737 A1 * | 8/2010 | Flynn et al. | 711/114 |
| 2010/0268871 A1 | 10/2010 | Lee et al. | |
| 2011/0022819 A1 * | 1/2011 | Post et al. | 711/207 |
| 2011/0029715 A1 * | 2/2011 | Hu et al. | 711/103 |

FOREIGN PATENT DOCUMENTS
EP 1804169 7/2007

* cited by examiner

*Primary Examiner* — Hiep Nguyen
(74) *Attorney, Agent, or Firm* — Van Court & Aldridge LLP

(57) ABSTRACT

Systems and methods are disclosed for handling dynamic and static data for a system having non-volatile memory ("NVM"). By determining whether data being written to the NVM is dynamic or not, a NVM interface of a system can determine where to initially place the data on the NVM (e.g., place the data on either a dynamic stream block or a static stream block). Moreover, this information can allow the NVM interface to improve the efficiencies of both garbage collection ("GC") and wear leveling.

28 Claims, 8 Drawing Sheets

HANDLING DYNAMIC AND STATIC DATA FOR A SYSTEM HAVING NON-VOLATILE MEMORY

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A NVM may include both data that is needed by an electronic device (e.g., "valid data") and data that is no longer needed by the electronic device (e.g., "invalid data"). Valid data stored in a NVM can further be separated into data that is frequently updated or changed (e.g., "dynamic data") and data that is rarely updated or changed (e.g., "static data"). Conventionally, the placement of data in the NVM is rather arbitrary, such that there may be a mixture of dynamic and static data stored in a single block of the NVM.

Some NVMs are configured such that a block of programmed memory locations needs to be erased before any of the memory locations in the block can be reprogrammed. Therefore, electronic devices typically perform an operation referred to as "garbage collection" ("GC") to free up blocks for erasing and reprogramming. To free up all of the memory locations in that block for erasing, the electronic device may copy the block's valid data into memory locations of another block. Because there is a mixture of dynamic and static data on a block, the efficiency of GC can be low because the amount of valid data that has to be copied may be significant.

In addition, electronic devices may sometimes perform GC on a block using an operation referred to as "wear leveling". Wear leveling is generally used to extend the useful life of the NVM. Oftentimes, systems may perform unnecessary wear leveling of the NVM, which may in fact result in more wear of the NVM.

SUMMARY OF THE DISCLOSURE

Systems and methods are disclosed for handling dynamic and static data for a system having non-volatile memory. By determining whether data being written to the NVM is dynamic, a NVM interface of a system can determine where to initially place data on the NVM. Moreover, this allows the NVM interface to improve the efficiencies of both garbage collection and wear leveling.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for handling dynamic and static data for a system having non-volatile memory ("NVM") are provided. By determining whether data being written to the NVM is dynamic, a NVM interface of a system can determine where to initially place the data on the NVM. Moreover, this allows the NVM interface to improve the efficiencies of both garbage collection ("GC") and wear leveling.

For example, in response to receiving a write request corresponding to a logical block address ("LBA") range, the NVM interface can determine whether data associated with the LBA range is dynamic. In some embodiments, the NVM interface can make this determination based on one or more parameters obtained from a tree or metadata. The one or more parameters can be any suitable parameter such as, for example, a counter indicating the number of times a particular LBA range has been written, a user weave sequence indicating when data was last written to a LBA range by an application and/or operating system, a weave sequence indicating when data was last written to a LBA range by any source (e.g., by a GC process or by an application or operating system), and/or any combination thereof. Based on the determination of whether data associated with the LBA range is dynamic or not dynamic, the NVM interface can program the data to either a dynamic stream block or a static stream block.

As used herein, a "dynamic stream block" may be any suitable block of the NVM that has been assigned by the NVM interface as part of a dynamic stream. Incoming data that is classified as dynamic may be selectively placed on one or more dynamic blocks. Likewise, as used herein, a "static stream block" may be any suitable block of the NVM that has been assigned by the NVM interface as part of a static stream. Incoming data that is classified as static may be selectively placed on one or more static blocks.

By splitting incoming data into two separate write streams, GC write amplification can be reduced and the efficiency of GC can consequently be improved. In addition, the determination of whether data is dynamic allows the NVM interface to avoid unnecessary wear leveling of the NVM.

Figure 1:
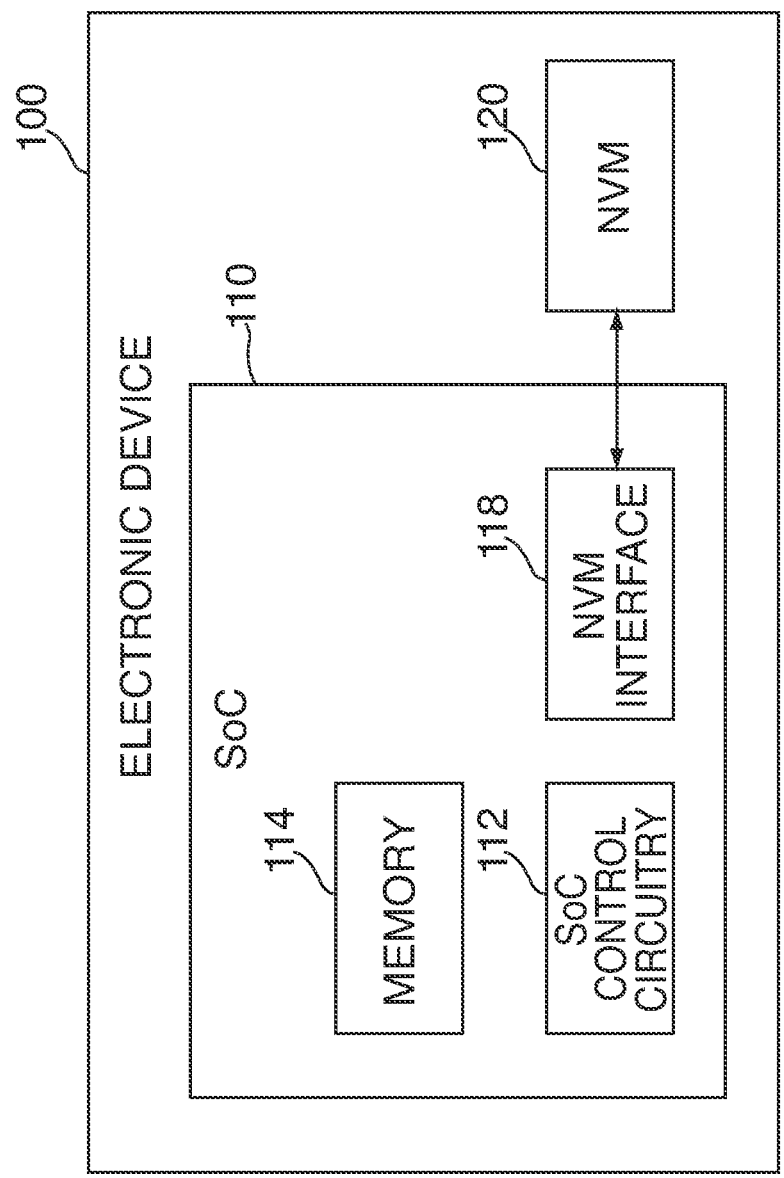
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 2:
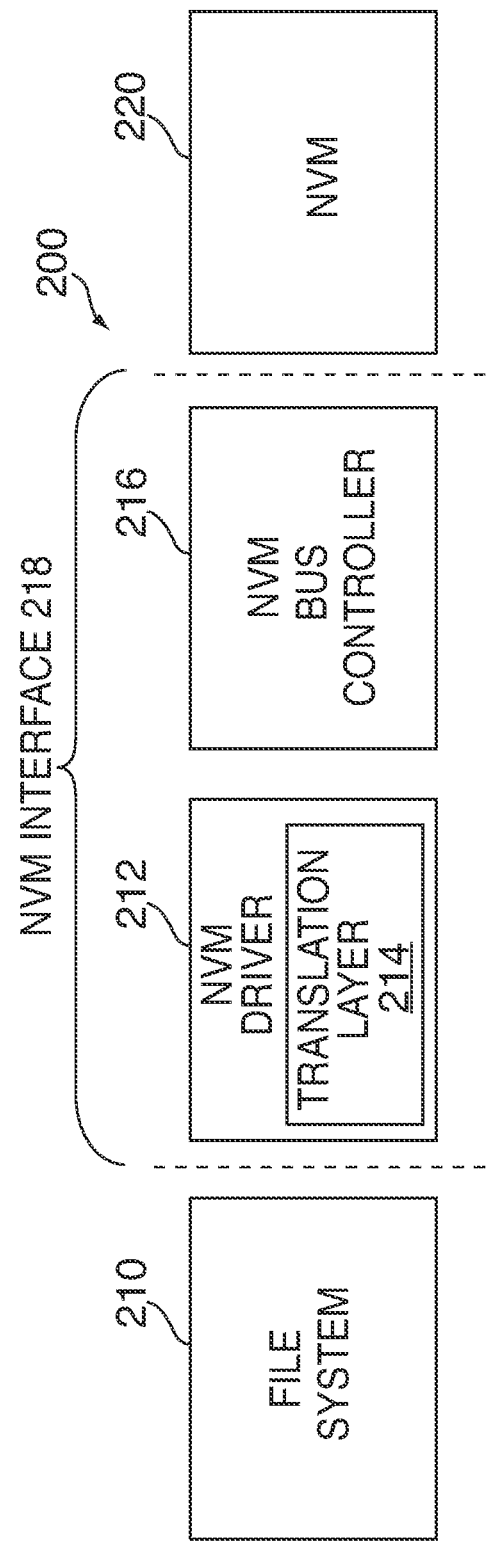

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical to physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read requests to NVM driver 212 when the application or operating system requests that information be read from or stored in NVM 220. Along with each read or write request, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write request, translation layer 214 can map the provided logical address to a free, erased physical location on NVM 220. On a read request, translation layer 214 can use the provided logical address to determine the physical address at which the requested data is stored. Because each NVM may have a different layout depending on the size or vendor of the NVM, this mapping operation may be memory and/or vendor-specific.

In addition to logical-to-physical address mapping, translation layer 214 can perform any other suitable functions that may be typical of flash translation layers. For example, translation layer 214 can perform garbage collection ("GC") to free up a programmed block of NVM 220 for erasing. Once freed and erased, the memory locations can be used to store new user data received from file system 210, for example. In some cases, the GC process may involve copying the valid data from the programmed block to another block having erased memory locations, thereby invalidating the valid data in the programmed block. Once all of the memory locations in the programmed block have been invalidated, translation layer 214 may direct bus controller 216 to perform an erase operation on the programmed block. As used herein, "valid data" may refer to user data that has been programmed in response to the most recent write request corresponding to one or more logical addresses (e.g., LBAs), and may therefore be the valid version of user data for the one or more logical addresses.

As another example, translation layer 214 can perform wear leveling on NVM 220, which may be used to distribute wear on various blocks of NVM 220. Wear leveling is necessary because a portion of NVM 220 may be cycled substantially more than other portions of NVM 220 (e.g., beyond a cycling specification), which can potentially cause the system to run out of useable space. In addition, excessive wear on a small portion of NVM 220 may lead to worse data retention overall.

Translation layer 214 can perform wear leveling by first monitoring the number of cycles (e.g., erase cycles and/or write cycles) that each block of NVM 220 has cycled through. Then, at a suitable time (e.g., during idle time or during a GC process), translation layer 214 can select a block of NVM 220 to initiate wear leveling. In some embodiments, the block may be selected using a wear-leveling queue.

After selecting the block, translation layer 214 can initiate wear leveling on that block. For example, translation layer 214 may perform GC on the block (e.g., by copying the valid data stored on the block to another block and erasing the block).

In some embodiments, NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, ECC data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. Metadata will be discussed in more detail in connection with FIG. 5.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Figure 3:
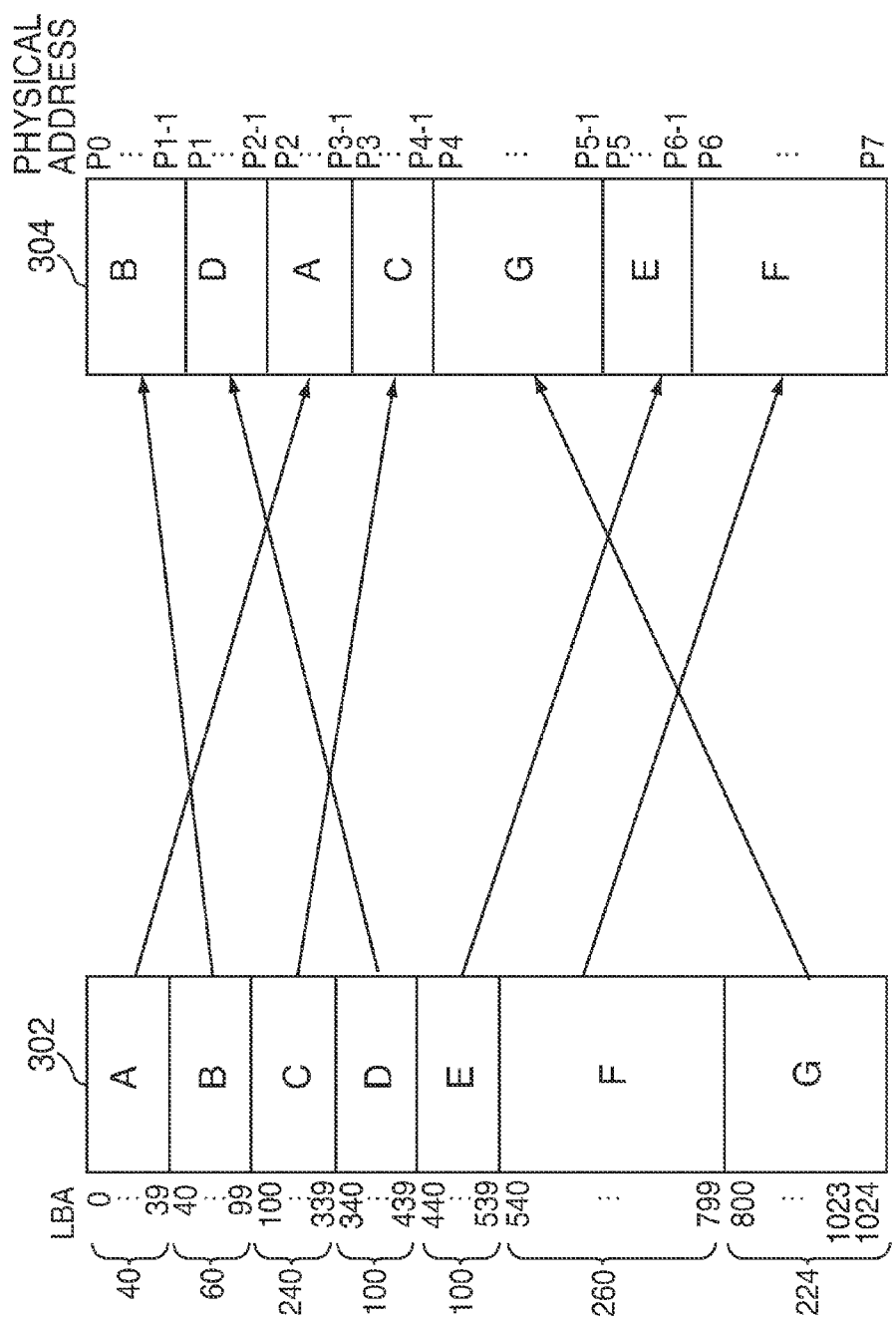
FIG. 3 is a block diagram of an illustrative mapping of logical block addresses to physical pages in accordance with various embodiments of the invention.

Referring now to FIG. 3, a block diagram illustrating an example mapping of logical block addresses 302 to physical pages 304 is shown. Logical block addresses can correspond to logical blocks in a logical space. Each logical block can be the smallest granular unit of the logical space that can be read from and/or written to, and can have any suitable size such as, for example, 512 bytes, 4K, or 8K.

A file system (e.g., file system 210 of FIG. 2) can allocate any suitable number of LBAs to a file. For instance, as shown in FIG. 3, LBAs 302 can correspond to files A-G, where each of the files A-G is allocated a particular LBA range. For example, file A is allocated LBA range 0-39, file B is allocated LBA range 40-99, file C is allocated LBA range 100-339, and so on. The size of each file A-G is shown by the numbered spans to the left of the files.

In addition, LBAs may be used by the file system to reference data stored in one or more memory locations of a NVM (e.g., NVM 120 of FIG. 1 or NVM 220 of FIG. 2). For example, each LBA of LBAs 302 can map to a page of pages 304. Accordingly, each LBA can map to the physical address of a corresponding page. As shown in FIG. 3, for instance, the LBA range for file A maps to the physical addresses beginning with P2 and ending with P3-1, the LBA range for file B maps to the physical addresses beginning with P0 and ending with P1-1, and so on.

Figure 4:
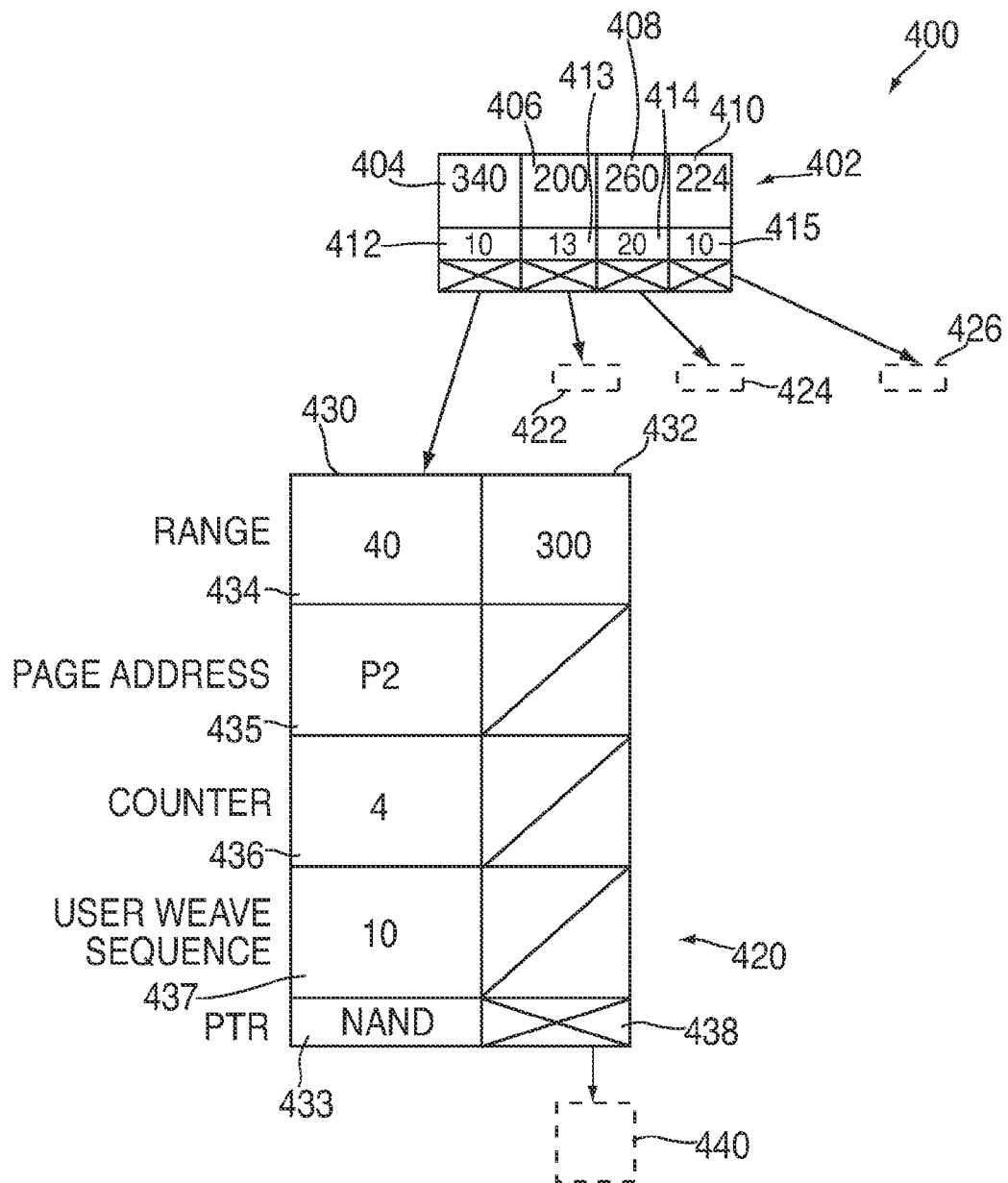
FIG. 4 is a block diagram of an illustrative tree used for providing logical to physical address mappings in accordance with various embodiments of the invention.

FIG. 4 shows a block diagram of tree 400, which may be used to provide logical to physical mappings. In particular, tree 400 can provide a mapping between LBA ranges (e.g., LBA ranges of LBAs 302 of FIG. 3) and corresponding physical addresses (e.g., physical addresses of pages 304 of FIG. 3) of a NVM (e.g., NVM 120 of FIG. 1 or NVM 220 of FIG. 2). In some embodiments, tree 400 can be stored and maintained in volatile memory (e.g., memory 114 of FIG. 1).

Tree 400 can include multiple nodes, where each node may be consistently sized for memory allocation purposes (e.g., each node may have a fixed size of 64 bytes). In addition, each node of tree 400 can include one or more entries. For example, as shown in FIG. 4, node 402 can include four entries (e.g., entries 404-410).

Each entry of a node can correspond to a LBA range (e.g., a run-length encoding compressed ("rle-compressed") range), and can include either a pointer to another node ("a node pointer") or a physical address of the NVM ("a NAND pointer"). For instance, as shown in FIG. 4, entries 404-410 are shown to correspond to LBA ranges 340, 200, 260, and 224, respectively.

Moreover, as shown in FIG. 4, each of entries 404-410 can have node pointers that point to additional nodes in the tree. In particular, entry 404 is shown as pointing to node 420, which in turn has two entries (e.g., entries 430 and 432). Persons skilled in the art will appreciate that entries 406-410 can also point to other nodes in tree 400 (e.g., nodes 422-426). However, for the sake of simplicity, these nodes are not shown in detail, but are rather shown as dashed boxes.

Each of entries 404-410 may include counters 412-415, which can indicate the number of times a particular LBA range has been written. For example, as shown in FIG. 4, the LBA ranges corresponding to each of entries 404-410 have counters with values of 10, 13, 20, and 10, respectively. Counters will be discussed in more detail below.

Entry 430 of node 420 has a NAND pointer 433 that points to a physical address of the NVM (e.g., page address P2). In contrast, entry 432 of node 420 has a node pointer 438 that points to another node in tree 400 (e.g., node 440). For the sake of simplicity, node 440 is not shown in detail, but is rather shown as a dashed box.

Because LBA ranges (e.g., rle-compressed ranges) are stored in tree 400 instead of LBAs, a NVM interface (e.g., NVM interface 118 of FIG. 1 or NVM interface 218 of FIG. 2) may need to traverse tree 400 from a top node to the bottom nodes in order to obtain a logical to physical mapping of a particular file. For example, based on the LBAs of a file, the NVM interface can increment an address tally as it expands from the top node of tree 400 until the resulting address tally matches the LBAs of the file. Persons skilled in the art will appreciate that tree 400 can have any suitable tree structure. In some cases, tree 400 can have a tree structure that improves the retrieval time for a particular entry such as, for example, a b-tree or a b*-tree.

In comparison to a mapping system that stores LBAs (e.g., starting and ending LBAs), each entry of tree 400 can be allocated a smaller amount of memory, which is beneficial for a system with space constraints. In particular, each entry of tree 400 can be allocated a number of bits that corresponds to the size of the range that is stored in the entry. As a LBA range increases in size, the number of bits allocated to the corresponding entry also increases. For example, if an entry of a node corresponds to a small rle-compressed range, the entry can be allocated a smaller size (e.g., 4 bytes). Alternatively, if an entry of a node is storing a large rle-compressed range, the entry can be allocated a larger size (e.g., 6 bytes). Because the size allocated to a particular entry is dynamic, each node of tree 400 can fit a variable number of entries.

Moreover, by storing LBA ranges instead of LBAs, more pointers (e.g., node and NAND pointers) can be included in each node of tree 400. For example, if each node of tree 400 is allocated 64 bytes and each entry is then allocated between 4 to 6 bytes, each node of tree 400 may be capable of storing 10 to 16 pointers.

As shown in FIG. 4, one or more entries of tree 400 may have fields containing information associated with the entry. For example, entry 430 may include range 434 and page address 435, which can respectively provide the LBA range and page address of the entry. In particular, if entry 430 corresponds to file A (FIG. 3), range 434 and page address 435 can have values of 40 and P2, respectively.

In addition, counter 436 can indicate the number of times that LBA range 434 has been written. For example, when the NVM interface detects that a file system (e.g., file system 210 of FIG. 2) has issued a write request for a particular LBA range (e.g., a file that has been assigned to the LBA range), the NVM interface can increment a counter that corresponds to that LBA range (e.g., increment the counter by one). In the example shown in FIG. 4, for instance, counter 436 indicates that range 434 has been written four times so far. Persons skilled in the art will appreciate that each of entries 404-410, 430 and 432 can include additional fields not shown in FIG. 4.

Generally, counters corresponding to entries of tree 400 can provide an indication of how dynamic or static a piece of data is. For example, when data is first written to a new file, it may be unclear whether data associated with the file is dynamic or static. However, as the file is continually updated, inferences can be made as to whether data associated with the file is dynamic data based on the number of times that the file is written. As used herein, "dynamic data" can be valid data stored in a NVM that is frequently updated or changed. In contrast, "static data" can be valid data stored in a NVM that is rarely updated or changed.

Counters of tree 400 can be changed in various ways depending on the occurrence of one or more events. For example, a counter corresponding to an entry in a tree may eventually saturate at a maximum value (e.g., 0xff for an 8-bit counter). Thus, in some cases, the NVM interface can monitor the counters of tree 400, and detect when a counter in tree 400 has reached a maximum value. Upon detecting that a counter has reached a maximum value, the NVM interface can halve the values of all counters of the tree. This is possible because the measurement of dynamic/static characteristics of data in a system is relative.

As another example, if a contiguous LBA range splits into two or more ranges, the NVM interface can copy the counter previously associated with the LBA range to an entry associated with each of the two or more split ranges. The NVM interface can then increment counters associated with the split ranges that are being written to. In the example shown in FIG. 4, for instance, if LBA range 434 splits into two ranges (e.g. a lower range and an upper range), the NVM interface can copy the value of counter 436 into each of the resulting entries. If a write request is then issued for the upper range, the NVM interface can update the counter of the upper range, but retain the same value for the counter of the lower range.

As yet another example, if the NVM interface determines that a LBA range has been deleted, the NVM interface can reset a counter corresponding to the LBA range to a default value (e.g., a default value of 0). This is because the dynamic characteristics of data written for a particular LBA range can often depend on the type of file that is assigned to the LBA range. Thus, a new file that is assigned to a LBA range may have different dynamic characteristics than a previous file that was assigned to the LBA range, so the corresponding counter in tree 400 should also be reset.

In some embodiments, one or more entries of tree 400 can also include user weave sequence 437, which can correspond to an age when data was last written to a particular LBA range by an application and/or operating system (e.g., data was last written by a host). In some cases, user weave sequence 437 may be a counter (e.g., a 48-bit counter) that increments as data updates are made to the LBA range. For example, as shown in FIG. 4, for instance, user weave sequence 437 in tree 400 indicates that the age when data was last written to range 434 is 10.

Instead of or in addition to storing user weave sequence in tree 400, persons skilled in the art will appreciate that the user weave sequence of data can be stored in any other suitable location in a system. For example, the user weave sequence may be stored as metadata in a page of a NVM (e.g., NVM 120 of FIG. 1 or NVM 220 of FIG. 2).

Figure 5:
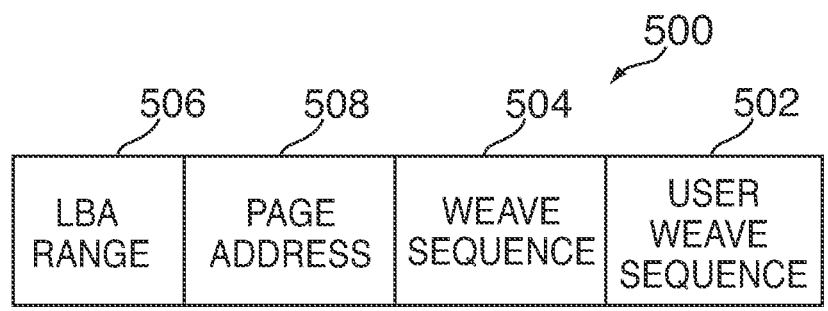
FIG. 5 is a graphical view of metadata that can be associated with user data in accordance with various embodiments of the invention.

Turning now to FIG. 5, metadata 500 can represent different types of metadata that can be associated with user data stored in a NVM (e.g., NVM 120 of FIG. 1 or NVM 220 of FIG. 2). As shown in FIG. 5, metadata 500 can include user weave sequence 502, which can correspond to an age when data was last written to an associated LBA range (e.g., LBA range 506) by an application and/or operating system. As a result, user weave sequence 502 can be similar to user weave sequence 437 (FIG. 4). Consequently, when comparisons need to be made at a later time, a NVM interface may be able to obtain the user weave sequence from either a tree (e.g., tree 400 of FIG. 4) or metadata 500.

In some embodiments, metadata 500 can include weave sequence 504, which can correspond to an age when data was last written to LBA range 506 by any source (e.g., by a GC process or by an application or operating system). Persons skilled in the art will appreciate that any suitable types of metadata can be stored in the NVM. For example, as shown in FIG. 5, metadata 500 can also include page address 505, which can correspond to one or more page addresses associated with the user data. As another example, one or more counters (e.g., similar to counters 412-415 or counter 436 of FIG. 5) and/or ECC data (not shown in FIG. 5) can also be included in metadata 500. Persons skilled in the art will also appreciate that weave sequence can instead or in addition be stored in a tree (e.g., tree 400 of FIG. 4).

Any suitable approach can be used to determine whether data associated with a LBA range (e.g., a file) is dynamic. In some embodiments, the NVM interface can determine whether a dynamic value associated with the LBA range is greater than or equal to a pre-determined threshold. The dynamic value can correspond to a counter of the LBA range (e.g., one of counters 412-415 or counter 436 of FIG. 4), a user weave sequence, a weave sequence, any other suitable value, and/or any combination thereof.

Correspondingly, the pre-determined threshold can correspond to an average dynamic value of data stored in a NVM. In some cases, the pre-determined threshold can be determined using heuristics obtained by scrubbing tree 400. The average dynamic value can therefore vary over time depending on the total number of writes issues by a file system and the dynamic characteristics of all of the data stored on the NVM. As such, the determination of whether a particular piece of data is dynamic may be relative to the average dynamic value of all of the data stored on the NVM.

As an example, the NVM interface can obtain the pre-determined threshold by first scrubbing each node of tree 400 to determine a distribution of the dynamic characteristics of the data stored on the NVM. Then, using the distribution of the dynamic characteristics, the NVM interface can calculate an average dynamic value of data stored on the NVM.

In other embodiments, the NVM interface can determine whether data associated with a LBA range is dynamic by performing a relative comparison between a counter and an age of data, such as a user weave sequence of data (e.g., user weave sequence 437 of FIG. 4 or user weave sequence 502 of FIG. 5). In some embodiments, the NVM interface can determine if the user weave sequence is young or old by comparing the user weave sequence to a current age of the system.

After determining whether the user weave sequence is young or old, the NVM interface can compare the user weave sequence with the counter. For instance, if the user weave sequence is relatively young and the counter has a large value (e.g., the LBA range has frequently been written to), the NVM interface can determine that the data is relatively dynamic. Alternatively, if the user weave sequence is relatively old and the counter has a small value (e.g., the LBA range has rarely been written to), the NVM interface can determine that the data is relatively static. Furthermore, if the user weave sequence is relatively old and the counter has a large value, the NVM interface can determine that the data was dynamic but is now static. Persons skilled in the art will appreciate that instead of comparing the counter to a user weave sequence, the NVM interface can compare the counter to weave sequence (e.g., weave sequence 504 of FIG. 5) or an age when a LBA range was first written.

In further embodiments, the NVM interface can determine whether data associated with a LBA range is dynamic by comparing an age when a LBA range was last written to an age when the LBA range was first written. The age when a LBA range was last written can correspond to a weave sequence (e.g., weave sequence 504 of FIG. 5) or a user weave sequence (e.g., user weave sequence 437 of FIG. 4 or user weave sequence 502 of FIG. 5).

Based on the above comparison, the NVM interface can obtain a difference in age, and determine if the difference in age is less than a pre-determined threshold. If the difference in age is below the pre-determined threshold, the NVM interface can determine that the data associated with the LBA range is dynamic.

In further embodiments, the NVM interface can determine if data is dynamic by comparing an age of data (e.g., the user weave sequence or weave sequence) with a time of a last boot-up event. The time of the last boot-up event can establish a relative baseline for comparison with the age of the data.

In yet further embodiments, the NVM interface can determine if data is dynamic based on information received from an operating system. For example, in addition to providing one or more LBAs, a LBA count, and a buffer associated with data to be stored in the NVM, the operating system may also provide information regarding whether the data is static.

Figure 6:
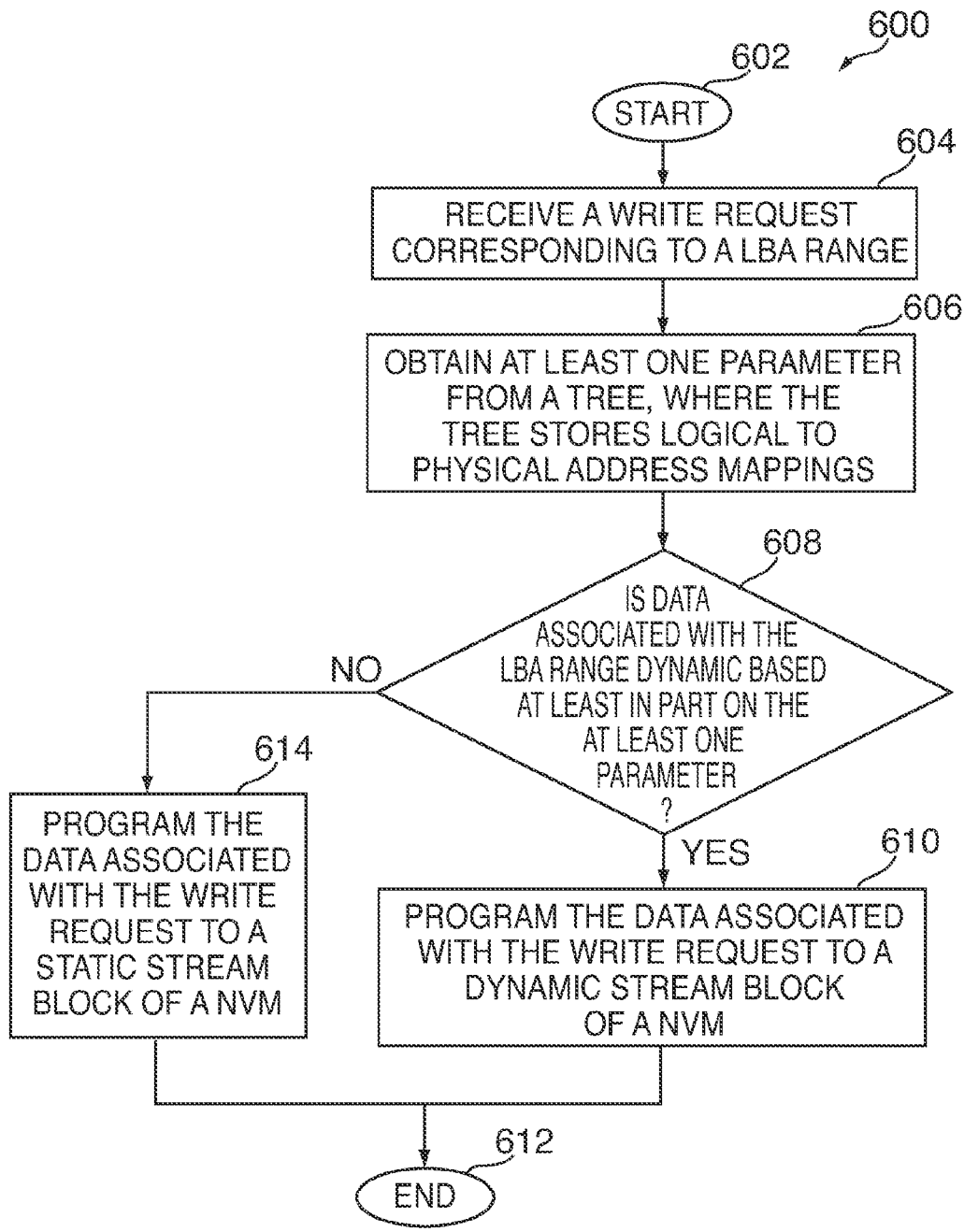
FIG. 6 is a flowchart of an illustrative process for programming data to a non-volatile memory in accordance with various embodiments of the invention.
Figure 7:
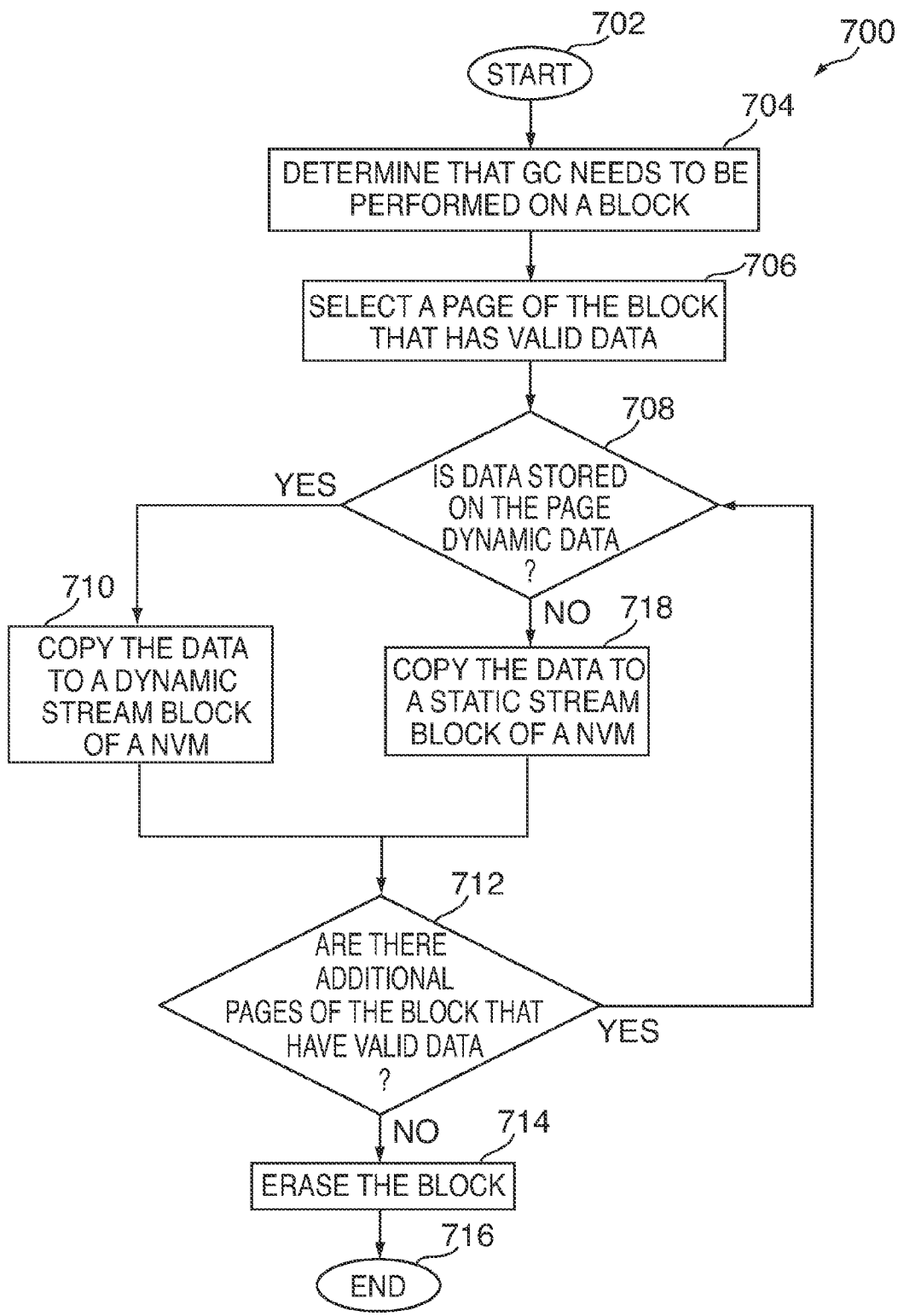
FIG. 7 is a flowchart of an illustrative process for performing garbage collection on a non-volatile memory in accordance with various embodiments of the invention.
Figure 8:
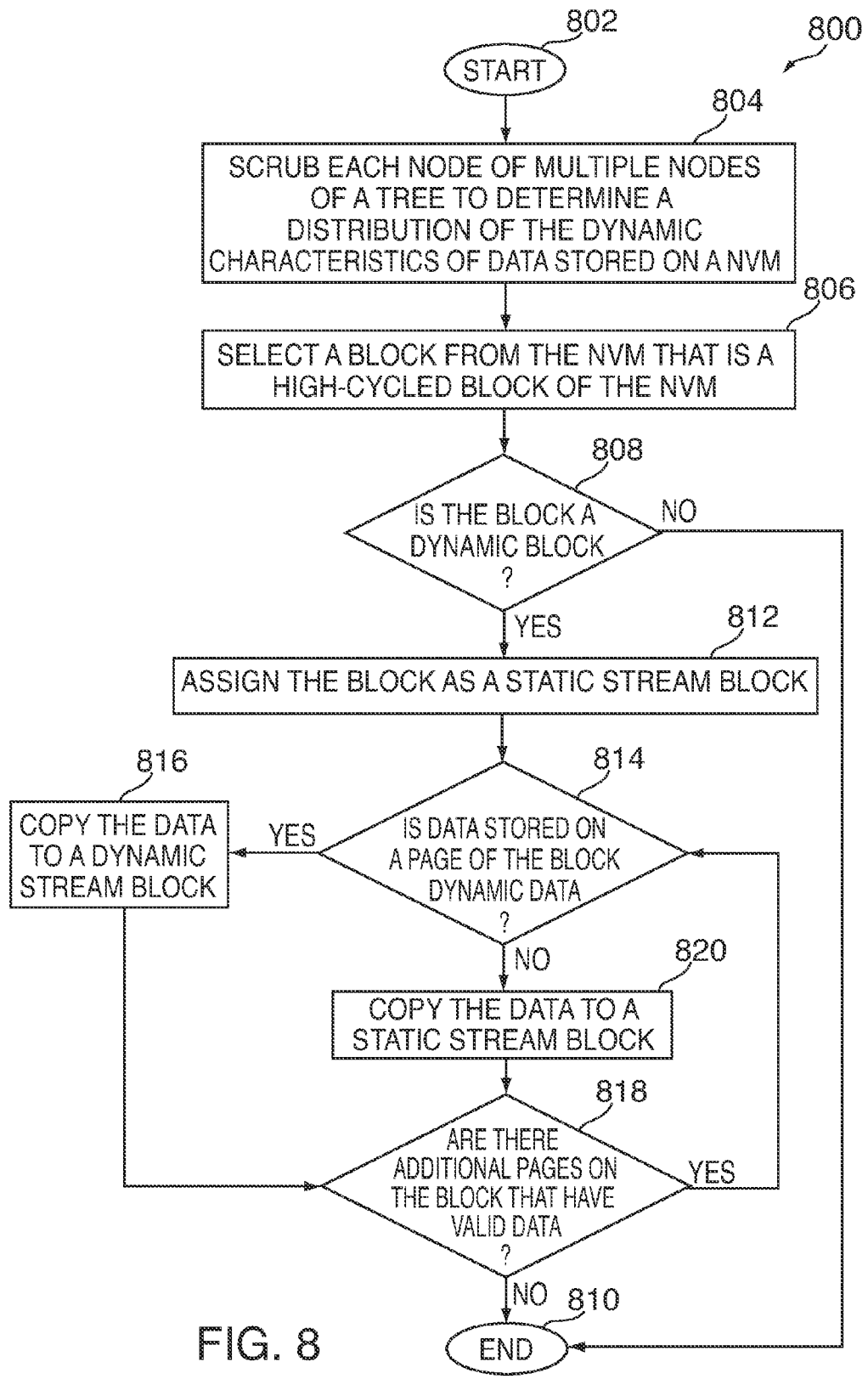
FIG. 8 is a flowchart of an illustrative process for determining whether to perform wear leveling on a non-volatile memory in accordance with various embodiments of the invention.

Referring now to FIGS. 6-8, flowcharts of illustrative processes are shown in accordance with various embodiments of the invention. These processes may be executed by one or more components of a system (e.g., electronic device 100 of FIG. 1). For example, at least some of the steps in the processes of FIGS. 6-8 may be performed by a NVM interface (e.g., NVM interface 118 of FIG. 1 or NVM interface 218 of FIG. 2).

Turning first to FIG. 6, process 600 is shown for programming data to a NVM (e.g., NVM 120 of FIG. 1 or NVM 220 of FIG. 2). Process 600 may begin at step 602. At step 604, the NVM interface can receive a write request corresponding to a LBA range. For example, the NVM interface may receive a write request to LBA range 434 (FIG. 4).

At step 606, the NVM interface can obtain at least one parameter from a tree, where the tree may store logical to physical address mappings. For example, the NVM interface can first identify an entry in a tree (e.g., tree 400 of FIG. 4) that corresponds to the LBA range. After identifying the entry, the NVM interface can obtain the at least one parameter from the identified entry. The at least one parameter may include a counter (e.g., one of counters 412-415 or counter 436 of FIG. 4) indicating the number of times that the LBA range has been written and/or a user weave sequence (e.g., user weave sequence 437 of FIG. 4) corresponding to an age when data was last written to the LBA range by an application and/or operating system.

Continuing to step 608, the NVM interface can determine whether data associated with the LBA range is dynamic based at least in part on the at least one parameter. For example, the NVM interface can determine whether a counter associated with the LBA range is greater than or equal to a pre-determined threshold (e.g., an average dynamic value of data stored in a NVM determined using heuristics obtained from the tree).

As another example, the NVM interface can perform a relative comparison between a counter and an age of data. The age of the data can be any suitable age such as, for example, a user weave sequence of data, a weave sequence of data (e.g., weave sequence 504 of FIG. 5), or an age when the LBA range was first written. As yet another example, the NVM interface can compare an age when a LBA range was last written (e.g., a user weave sequence or a weave sequence) to an age when the LBA range was first written.

If, at step 608, the NVM interface determines that the data associated with the LBA range is dynamic, process 600 may move to step 610. At step 610, the NVM interface can direct a bus controller (e.g., NVM bus controller 216 of FIG. 2) to program the data associated with the write request to a dynamic stream block of the NVM. Process 600 may then end at step 612.

As used herein, a "dynamic stream block" may be any suitable block of the NVM that has been assigned by the NVM interface as part of a dynamic stream. Incoming data that is classified as dynamic may be selectively placed on one or more dynamic blocks. For example, in one embodiment, a dynamic stream block may have previously been a low-cycled block of the NVM that was later assigned to be a dynamic stream block.

If, at step 608, the NVM interface instead determines that the data associated with the LBA range is not dynamic, process 600 may move to step 614. At step 614, the NVM interface can direct the bus controller to program the data associated with the write request to a static stream block of the NVM. Process 600 may then end at step 612.

As used herein, a "static stream block" may be any suitable block of the NVM that has been assigned by the NVM interface as part of a static stream. Incoming data that is classified as static may be selectively placed on one or more static blocks. In one embodiment, a static stream block may have previously been a high-cycled block of the NVM that was later assigned to be a static stream block.

In some embodiments, the NVM interface can use separate write pointers to write to the dynamic stream block or the static stream block. For example, the NVM interface can use a dynamic write pointer to write to a dynamic stream block, and a static write pointer to write to a static stream block.

Thus, by determining whether a particular piece of data is dynamic or static, the NVM interface can better determine the initial placement of the data on the NVM. This can improve the efficiency of garbage collection ("GC"), which can consequently reduce the wearing of the NVM. For example, by splitting dynamic and static data into separate blocks on the NVM, the NVM interface can select to perform GC on a dynamic stream block of the NVM instead of a static stream block. Because a dynamic stream block may eventually have little or no valid pages due to the frequency with which dynamic data is updated, the amount of valid data that has to be moved during GC is minimal. Consequently, GC write amplification can be reduced.

For example, referring now to FIG. 7, a flowchart of illustrative process for performing GC on a NVM (e.g., NVM 120 of FIG. 1 or NVM 220 of FIG. 2) is shown. Process 700 may start at step 702. At step 704, a NVM interface may determine that GC needs to be performed on a block of the NVM. At step 706, the NVM interface may select a page of the block that has valid data.

Continuing to step 708, the NVM interface can determine whether data stored on the page is dynamic data. As mentioned above, the NVM interface can determine whether data is dynamic using any suitable approach. For example, the NVM interface can find an entry (e.g., entry 430 of FIG. 4) of a tree (e.g., tree 400 of FIG. 4) corresponding to a LBA range of the data. The NVM interface can then determine if a counter (e.g., one of counters 412-415 or counter 436 of FIG. 4) of the entry is greater than or equal to a pre-determined threshold (e.g., an average dynamic value). As another example, the NVM interface can determine whether data is dynamic based on information received from an operating system.

If, at step 708, the NVM interface determines that the data stored in the page is dynamic data, process 700 may move to step 710. For example, the NVM interface may determine that a counter of a corresponding entry of a tree is greater than or equal to a pre-determined threshold.

At step 710, the NVM interface can direct a bus controller (e.g., NVM bus controller 216 of FIG. 2) to copy the data to a dynamic stream block of the NVM. Then, continuing to step 712, the NVM interface can determine if there are additional pages of the block that have valid data.

If, at step 712, the NVM interface determines that there are additional pages that have valid data, process 700 may return to step 708, where the NVM interface can determine whether the data stored on another page of the block is dynamic data. The NVM interface can subsequently repeat this process for each page of the block that has valid data.

Referring back to step 712, if the NVM interface instead determines that there are no additional pages of the block that have valid data, process 700 may move to step 714.

At step 714, the NVM interface can direct the bus controller to erase the block, and process 700 may end at step 716. Erasing the block consequently allows the block to be reprogrammed with new data.

Referring back to step 708, if the NVM interface instead determines that the data stored on the page is not dynamic data, process 700 may move to step 718. For example, the NVM interface may determine that a counter of a corresponding entry of a tree is less than a pre-determined threshold. As a result, the NVM interface may determine that the data is static.

At step 718, the NVM interface can direct the bus controller to copy the data to a static stream block of the NVM. Process 700 may then move to step 712, where the NVM interface can determine if there are additional pages of the block that have valid data.

Accordingly, using such an approach, the NVM interface may be able to change an initial determination of whether data is dynamic or static. Thus, if a particular piece of data has changed from dynamic data to static data or from static data to dynamic data, the NVM interface can change the placement of that data while performing GC on a block.

Turning now to FIG. 8, a flowchart of an illustrative process 800 for determining whether to perform wear leveling on a NVM (e.g., NVM 120 of FIG. 1 or NVM 220 of FIG. 2) is shown. Process 800 may start at step 802.

At step 804, a NVM interface can scrub each node of multiple nodes of a tree (e.g., tree 400 of FIG. 4) to determine a distribution of the dynamic characteristics of data stored on a NVM. The NVM interface can then determine whether wear leveling is needed on the NVM based at least in part on the distribution of the dynamic characteristics. In some cases, the NVM interface can calculate an average dynamic value of data stored on the NVM using the distribution of the dynamic characteristics.

For example, at step 806, the NVM interface can select a block from the NVM that is a high-cycled block of the NVM. In some cases, the block may have a particular number of cycles (e.g., erase cycles and/or write cycles), where the number of cycles exceed the cycling of the other blocks of the NVM by a pre-determined gap.

Continuing to step 808, the NVM interface can determine whether the block is a dynamic block. For example, based on one or more parameters obtained from a tree (e.g., tree 400 of FIG. 4) or obtained from metadata (e.g., metadata 500 of FIG. 5), the NVM interface can calculate a block dynamic value of data stored on the block.

The NVM interface can then compare the block dynamic value with the dynamic characteristics of the data stored on the NVM. In some embodiments, the NVM interface can determine whether data stored on the block has a block dynamic value that is greater than or equal to the average dynamic value. In other embodiments, the NVM interface can determine whether data stored on the block has a block dynamic value that is a constant multiple of the average dynamic value. In further embodiments, the NVM interface can determine whether data stored on the block has a block dynamic value that is outside of a pre-determined number of standard deviations from the average dynamic value.

If, at step 808, the NVM interface determines that the block is not a dynamic block, process 800 may end at step 810. Consequently, the NVM interface can keep data on the block. This way, the NVM interface can avoid performing wear leveling on the block because it is determined to be unnecessary.

If, at step 808, the NVM interface instead determines that the block is a dynamic block, process 800 may move to step 812. At step 812, the NVM interface can assign the block as a static stream block. As a result, future static data that is received from a file system (e.g., file system 210 of FIG. 2) may be placed on the block.

Then, continuing to step 814, the NVM interface can determine if data stored on a page of the block is dynamic data. If, at step 814, the NVM interface determines that the data stored on the page is dynamic data, process 800 may move to step 816.

At step 816, the NVM interface can direct a bus controller (e.g., NVM bus controller 216 of FIG. 2) to copy the data stored on the page to a dynamic stream block. Process 800 may then move to step 818.

At step 818, the NVM interface can determine whether there are additional pages on the block that have valid data. If, at step 818, the NVM interface determines that there are additional pages that have valid data, process 800 can return to step 814. At step 814, the NVM interface can determine whether the data stored on another page of the block is dynamic data. The NVM interface can subsequently repeat this process for each page of the block that has valid data.

If, at step 818, the NVM interface determines that are no additional pages that have valid data, process 800 may end at step 810. Consequently, GC can be performed on the block. For example, once all of the valid data stored on the block has been copied to other memory locations of the NVM, the block can be erased. After erasing the block, the NVM interface can begin to place static data (e.g., from GC and/or host writes) on the block.

Referring back to step 814, if the NVM interface instead determines that the data stored on the page is not dynamic data, process 800 can move to step 820. At step 820, the NVM interface can direct a bus controller to copy the data stored on the page to a static stream block. Process 800 may then move to step 818, where the NVM interface can determine whether there are additional pages on the block that have valid data.

By determining whether data is dynamic or static and integrating this information to wear leveling, a system can make better decisions regarding whether wear leveling is needed. By avoiding unnecessary wear leveling, the system can reduce the number of cycles performed on a NVM and the total bandwidth of the system. Moreover, information about whether data is dynamic also allows the system to make better decisions regarding where to move data while performing wear leveling on a block.

Furthermore, this approach allows the system to make wear leveling decisions at a finer granularity (e.g., pages of a block) than would otherwise be possible in a conventional wear leveling system where wear leveling is generally performed on an entire block. This finely tuned decision-making process also tends to reduce the amount of wear on the NVM, and tends to extend the useful life of the NVM.

It should be understood that processes 600, 700, and 800 of FIGS. 6-8, respectively, are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for determining dynamic data in an electronic device, the method comprising:
receiving a write request corresponding to a logical block address ("LBA") range;
obtaining at least one parameter from a tree, wherein the tree stores logical to physical address mappings;
determining whether data associated with the LBA range is dynamic based at least in part on the at least one parameter; and
in response to determining that the data associated with the LBA range is dynamic, programming the data associated with the write request to a dynamic stream block of a non-volatile memory ("NVM").

2. The method of claim 1, wherein the dynamic stream block is a block of the NVM that has been assigned by a memory interface as part of a dynamic stream.

3. The method of claim 1, wherein in response to determining that the data associated with the LBA range is not dynamic, programming the data associated with the write request to a static stream block of the NVM.

4. The method of claim 3, wherein the static stream block is a block of the NVM that has been assigned by a memory interface as part of a static stream.

5. The method of claim 1, wherein the at least one parameter comprises a counter indicating the number of times that the LBA range has been written.

6. The method of claim 2, further comprising incrementing the counter.

7. The method of claim 2, wherein the determining whether data associated with the LBA range is dynamic comprises determining whether the counter is greater than or equal to a pre-determined threshold.

8. The method of claim 2, wherein the at least one parameter further comprises a user weave sequence corresponding to an age when data was last written to the LBA range by at least one of an application or an operating system.

9. The method of claim 8, wherein the determining whether data associated with the LBA range is dynamic comprises performing a relative comparison between the counter and the user weave sequence.

10. The method of claim 8, wherein the determining whether data associated with the LBA range is dynamic comprises:
comparing the user weave sequence with an age when the LBA range was first written to obtain a difference in age; and
determining if the difference in age is less than a pre-determined threshold; and in response to determining that the difference in age is below the pre-determined threshold, determining that the data associated with the LBA range is dynamic.

11. The method of claim 8, wherein the determining whether data associated with the LBA range is dynamic comprises comparing the user weave sequence with a time of a last boot-up event.

12. A system comprising:
non-volatile memory ("NVM") comprising a plurality of blocks operative to store data;
volatile memory for storing a tree comprising a plurality of nodes; and
memory interface comprising:
a bus controller for communicating with the NVM; and
control circuitry operative to:
scrub each node of the plurality of nodes of the tree to determine a distribution of dynamic characteristics of the data stored on the NVM; and
determine whether wear leveling is needed on the NVM based at least in part on the distribution of the dynamic characteristics.

13. The system of claim 12, wherein the control circuitry is further operative to calculate an average dynamic value of data using the distribution of the dynamic characteristics.

14. The system of claim 13, wherein the control circuitry is further operative to:
select a block from the plurality of blocks that is a high-cycled block of the NVM;
determine whether a block is a dynamic block; and
in response to determining that the block is a dynamic block, assign the block as a static stream block.

15. The system of claim 14, wherein the control circuitry is operative to determine whether data stored on the block has a block dynamic value that is greater than or equal to the average dynamic value.

16. The system of claim 14, wherein the control circuitry is operative to determine whether data stored on the block has a block dynamic value that is a constant multiple of the average dynamic value.

17. The system of claim 14, wherein the control circuitry is operative to determine whether data stored on the block has a block dynamic value that is outside of a pre-determined number of standard deviations from the average dynamic value.

18. The system of claim 14, wherein the control circuitry is further operative to:
for each page of the block that has valid data, determine whether data stored on the page is dynamic data; and
in response to determining that the data stored on the page is dynamic data, direct the bus controller to copy the data to a dynamic stream block.

19. The system of claim 18, wherein in response to determining that the data stored on the page is not dynamic data, the control circuitry is further operative to direct the bus controller to copy the data to a static stream block.

20. A method for performing garbage collection in a non-volatile memory ("NVM"), the method comprising:
determining that garbage collection needs to be performed on a block of the NVM;
for each page of the block that has valid data, determining whether data stored on the page is dynamic based at least in part on a parameter obtained from a tree; and
in response to determining that the data is dynamic, copying the data to a dynamic stream block of the NVM.

21. The method of claim 20, further comprising erasing the block.

22. The method of claim 20, further comprising:
maintaining the tree comprising a plurality of entries, wherein the tree provides a mapping between logical block address ("LBA") ranges and corresponding physical addresses in the NVM; and
monitoring a plurality of counters in the tree, wherein each counter of the plurality of counters corresponds to an entry of the plurality of entries, and wherein the counter indicates the number of times the LBA range has been written.

23. The method of claim 22, wherein the determining whether the data stored in the page is dynamic comprises:
finding an entry of the plurality of entries corresponding to a LBA range of the data;
determining if a counter of the entry is greater than or equal to a pre-determined threshold; and
in response to determining that the counter of the entry is greater or equal to the pre-determined threshold, determining that the data is dynamic.

24. The method of claim 23, wherein in response to determining that the counter of the entry is less than the pre-determined threshold, determining that the data is static.

25. The method of claim 24, further comprising copying the data to a static stream block of the NVM.

26. The method of claim 22, further comprising:
detecting that a counter of the plurality of counters has reached a maximum value; and
having values of the plurality of counters of the tree.

27. The method of claim 22, further comprising:
determining that a LBA range has been deleted; and
resetting a counter of the plurality of counters corresponding to the LBA range to a default value.

28. The method of claim 22, further comprising:
detecting that a file system has issued a write request for a LBA range; and
incrementing a counter of the plurality of counters corresponding to the LBA range.

* * * * *

UNITED STATES PATENT AND TRADEMARK OFFICE
CERTIFICATE OF CORRECTION

PATENT NO. : 8,521,948 B2  
APPLICATION NO. : 12/983715  
DATED : August 27, 2013  
INVENTOR(S) : Daniel J. Post et al.

Page 1 of 1

It is certified that error appears in the above-identified patent and that said Letters Patent is hereby corrected as shown below:

In the claims

In Column 14, Line 46, in Claim 6, delete "claim 2," and insert -- claim 5, --, therefor.

In Column 14, Line 48, in Claim 7, delete "claim 2," and insert -- claim 5, --, therefor.

In Column 16, Line 42, in Claim 26, delete "having" and insert -- halving --, therefor.

Signed and Sealed this  
Twelfth Day of January, 2016

Michelle K. Lee  
*Director of the United States Patent and Trademark Office*